United States Patent
Berthoud et al.

(10) Patent No.: US 6,608,889 B2
(45) Date of Patent: Aug. 19, 2003

(54) TELEPHONE HAVING CONVENIENCE FEATURE DATA TRANSFER CAPABILITY

(75) Inventors: Charles William Berthoud, Bethlehem, PA (US); Paul Joseph Davis, Wayne, PA (US); Jeffrey Paul Grundvig, Loveland, CO (US); Arupratan Gupta, San Jose, CA (US); Mohd Majed Hobbi, Allentown, PA (US); Lakshmi Narayana Jampanaboyana, Allentown, PA (US)

(73) Assignee: Agere Systems Inc., Allentown, PA (US)

(*) Notice: Subject to any disclaimer, the term of this patent is extended or adjusted under 35 U.S.C. 154(b) by 290 days.

(21) Appl. No.: 09/768,292

(22) Filed: Jan. 25, 2001

(65) Prior Publication Data

US 2002/0097849 A1 Jul. 25, 2002

(51) Int. Cl.$^7$ .............................................. H04M 11/00
(52) U.S. Cl. .............................. 379/93.08; 379/93.05; 379/90.01; 379/355.06; 455/557
(58) Field of Search ........................ 379/90.01, 93.01, 379/93.05–93.08, 93.17–93.27, 354, 201.01, 355.06, 357.05; 455/557, 418, 564

(56) References Cited

U.S. PATENT DOCUMENTS

| 5,062,132 A | * 10/1991 | Yasuda et al. ............... 455/557 |
| 5,097,502 A | 3/1992 | Suzuki |
| 5,315,640 A | 5/1994 | Takayama |
| 5,764,731 A | 6/1998 | Yablon |
| 5,802,460 A | 9/1998 | Parvulescu |
| 5,812,946 A | 9/1998 | Nakabayashi |
| 5,930,703 A | * 7/1999 | Cairns ......................... 455/418 |
| 6,246,376 B1 | * 6/2001 | Bork et al. .................. 343/760 |

FOREIGN PATENT DOCUMENTS

| EP | 0 526 729 A2 | * 10/1993 |
| GB | 2 283 151 A | * 4/1995 |

* cited by examiner

Primary Examiner—Wing Chan
(74) Attorney, Agent, or Firm—William H. Bollman

(57) ABSTRACT

A method and apparatus for transferring convenience feature data (e.g., speed dial numbers, etc.) from one telephone to another local telephone within the same home or small office. In particular, the telephone includes a memory located within a corded or cordless telephone configured for storing data, and a transfer module configured to transfer requested data between the memory and a target device in response to a transfer request. The corded telephone utilizes a DTMF generator/receiver, a demodulation/modulation module, or a Bluetooth module to establish a communication path between the corded telephone and the target device. The cordless telephone utilizes a DTMF generator/receiver, a demodulation/modulation module, a radio frequency (RF) transceiver, or a Bluetooth module to establish a communication path between the cordless telephone and the target device. A transfer request may be a download, upload, or synchronization request between the memory of the corded or cordless telephone and the target device. By providing means to transfer data between corded or cordless telephone and a transfer device, information may be automatically shared locally or remotely between multiple devices. Moreover, telephones with corrupted memories or erased memories may be automatically updated or restored.

13 Claims, 12 Drawing Sheets

CORDED TELEPHONE

TELEPHONE HAVING CONVENIENCE FEATURE DATA TRANSFER CAPABILITY

BACKGROUND OF THE INVENTION

1. Field of the Invention

This invention relates generally to telephones with memories. In particular, it relates to corded and cordless telephones capable of transferring convenience data associated from one telephone which is already programmed by a user, and a target telephone.

2. Background

Telephones have become essential parts of homes and businesses. Networks of copper and fiber optics wires interconnect users from all over the world, thereby allowing users to conveniently communicate with each other by merely pressing a few buttons on a keypad.

In general, digital telephones come in two varieties: corded and cordless telephones. FIG. 8 illustrates a block diagram of a conventional digital corded telephone, and FIGS. 9A, 9B illustrates block diagrams of a conventional digital cordless telephone.

As shown in FIG. 8, a conventional digital corded telephone 700 includes a telephone line interface (TLI) 702, a ring detect circuit 704, a controller 706, a coder-decoder (CODEC) 708, a keypad 714, a memory 712, a program read only memory (ROM) 710, and a handset 716. The handset 716 of the corded telephone 700 includes a microphone 718 and a speaker 720.

An incoming call is received through the TLI 702 that is configured to provide an interface to a telephone switch network. The ring detect circuit 704 is configured to provide detection an incoming telephone call coming through the TLI 702 and to initiate the familiar telephone ring associated with the incoming telephone call.

The controller 706 is configured to place the telephone 700 in an off-hook mode in response to the user picking up the telephone handset 716 from a cradle (not shown) of the corded telephone 700. Incoming voice signals are converted by the CODEC 708 to drive the speaker 720 for the user to hear the incoming telephone conversation.

In the transmit direction, the CODEC 708 receives output voice signals from the microphone 718 and converts the output voice signals to analog electrical signals to send back to the caller through the TLI 702.

The controller 706 is configured to execute a software program or state machine that defines the functions of the corded telephone 700. With the appropriate software program or state machine, the corded telephone 700 may implement functions such as caller identification, speed dialing, or call waiting. The controller 706 may be implemented with a digital signal processor (DSP), microprocessor, microcontroller, or combinational logic.

The program ROM 710 is configured to provide a storage medium to store a software program or state machine that provides the functionality of the corded telephone 700. The memory 712 is configured to store user programmed data such as speed memory dial numbers, emergency numbers, and etc.

The keypad 714 is configured to provide an interface for a user to operate the corded telephone 700.

FIG. 9A shows a handset of a typical digital cordless telephone. In the transmit direction of the handset 802 of the conventional cordless telephone 800, a microphone 802 outputs an analog signal to a CODEC 804 in response to a user speaking during an active telephone call. The CODEC 804 is configured to convert a microphone input signal to a digital microphone signal to a radio frequency (RF) transceiver 806. In response to the received digital microphone signal, the RF transceiver 806 is configured to convert the received digital microphone signal into an RF signal for transmission to a complementary base unit 850.

A program read-only-memory (ROM) memory 810 is configured to provide a storage medium for the software or state machine that provides the functionality of handset 801. A memory 812 is configured to store user programmed data such as speed memory dial numbers, emergency numbers, and etc.

In the receive direction, the RF transceiver 806 receives an RF signal from the complementary base unit 850. The RF transceiver 806 converts the RF signal to a digital signal that is passed to the CODEC 804 for decoding. The output of the CODEC 804 is an analog signal for output by a speaker 816.

FIG. 9B shows a block diagram of a base unit 850 of the conventional digital cordless telephone 800. The base unit 850 contains circuitry which is complementary to that contained in the handset 801, i.e., a complementary RF transceiver 852, a controller 856, a CODEC 854, a program ROM 860, and a memory 862. The base unit 850 also includes a telephone line interface (TLI) 858 to interface with a public switched telephone network and a ring detect circuit 864 to detect an incoming telephone call through the TLI interface 858.

As digital telephones have become an essential part of homes and businesses, the cost of digital telephones has also dropped. As a result, it is not surprising to find multiple telephones in a home and/or business.

Moreover, digital telephones have become increasingly more and more sophisticated. Many digital telephones provide convenient functions such as speed dial, call waiting, caller identification (ID), and etc. In order to implement many of these features, digital memory is used to store convenience data, e.g., telephone numbers, caller ID tables, and etc.

However, in households with multiple digital telephones, each digital telephone must be manually programmed by the user with the same or similar convenience information, which leads to excess labor by the user, and the risk of errors or differences between different digital telephones.

Moreover, convenience memory of a digital telephone may become erased or corrupted, leading to the need for the user to again manually reprogram the digital telephone with custom convenience information, e.g., speed dial telephone numbers.

There is a need for an improved digital telephone which avoids the need to separately program different telephones within a house or small office.

SUMMARY OF THE INVENTION

In accordance with the principles of the present invention, a telephone module capable of transferring convenience feature data between separate telephones comprises a convenience feature data memory located within a first telephone configured to store convenience feature data relevant to the first telephone. A data transfer module is in communication with the convenience feature data memory, and is configured to transfer the convenience feature data to another telephone.

A method of transferring convenience feature data to a user's telephone from another telephone comprises initiating a request to transfer the convenience data from the other telephone. The convenience feature data is transferred from the other telephone to the user's telephone in response to the transfer request.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a digital telephone for transferring convenience data.

In particular, an embodiment of a digital telephone includes a memory located within a corded or cordless telephone configured for storing convenience data, and a transfer module configured to transfer requested convenience data between the memory and a target device in response to a transfer request. The disclosed, exemplary corded telephone utilizes a DTMF generator/receiver, a modulation/demodulation (modem) module, the radio frequency (RF) front ends of a cordless telephone, a Bluetooth module, or a removable/insertable storage medium (e.g., a floppy disk or memory stick) to establish a communication path between one digital telephone already programmed with convenience data and a target telephone to receive the convenience data from the already programmed telephone.

Figure 1A:
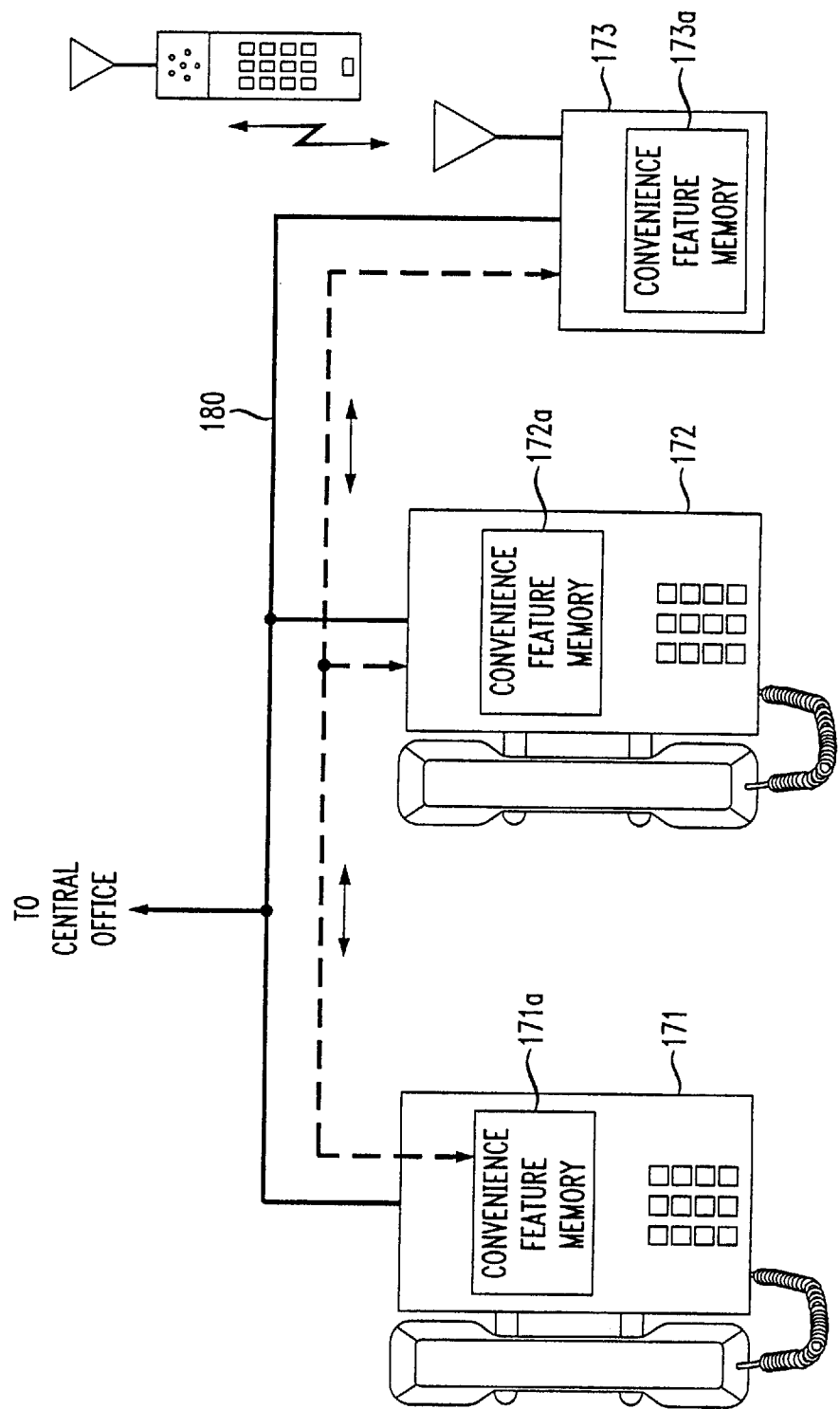
FIGS. 1A, 1B and 1C show various exemplary techniques for transferring convenience feature information between telephones within a home or small office, in accordance with the principles of the present invention.
Figure 1B:
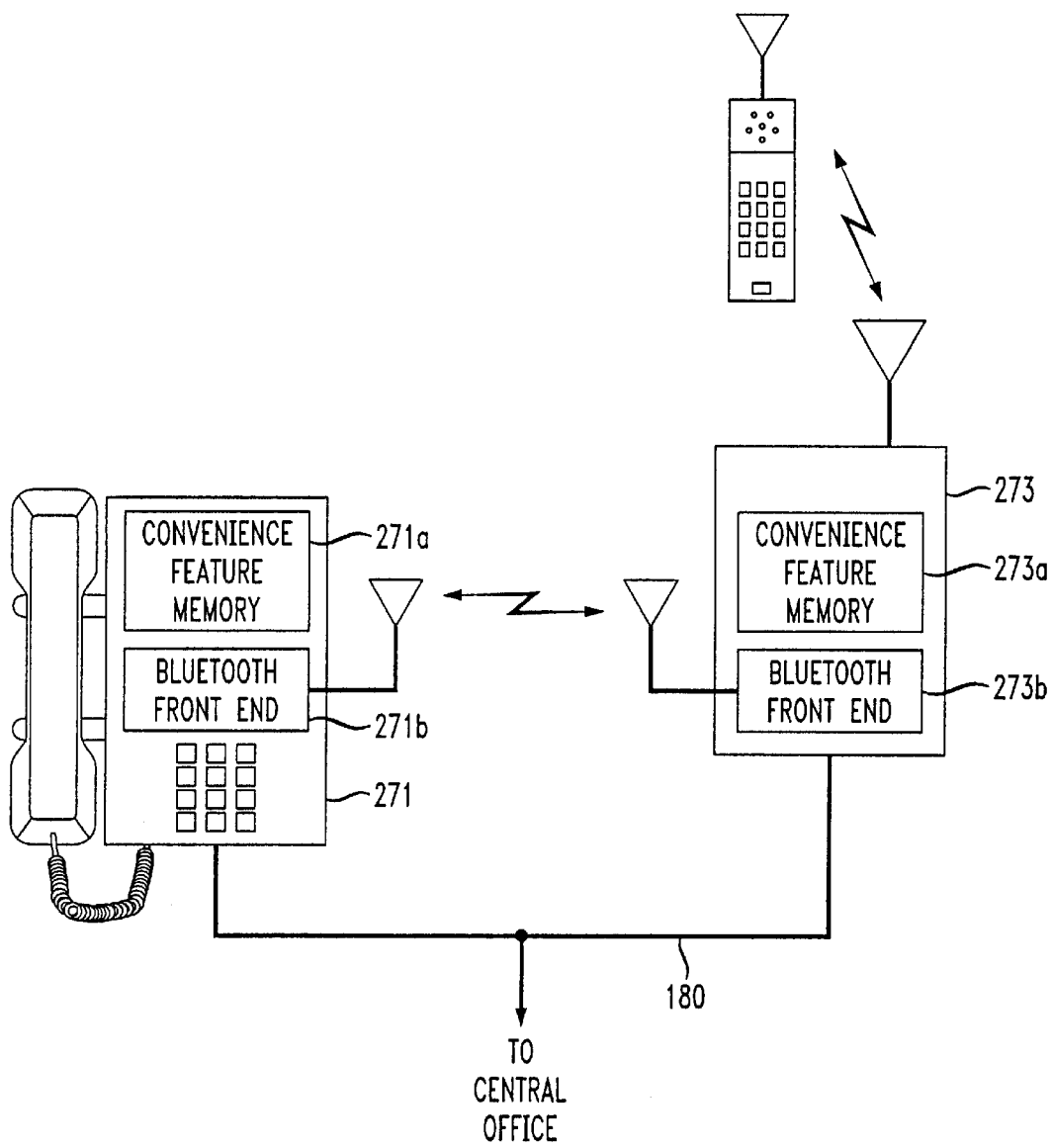
Figure 1C:
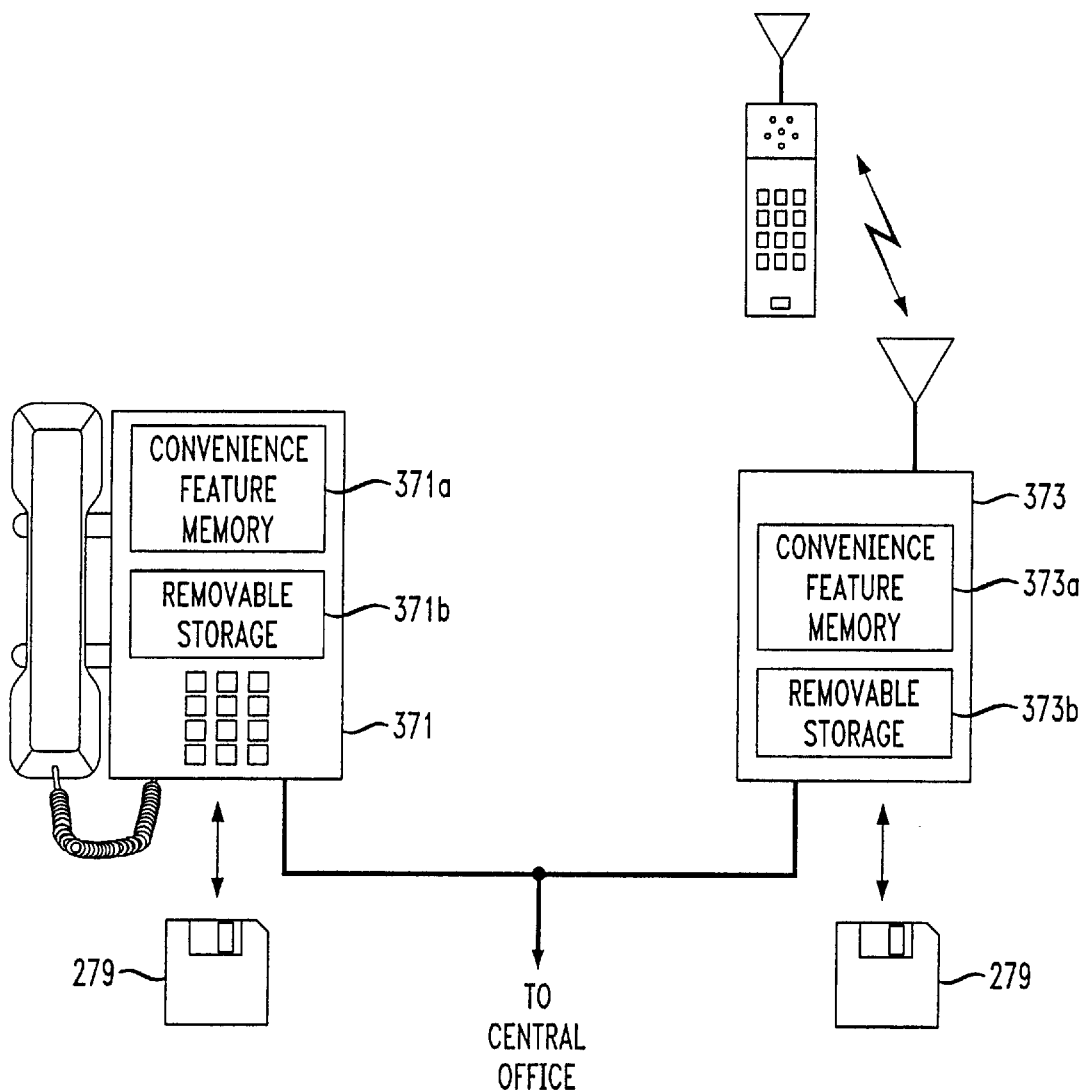

FIGS. 1A, 1B and 1C show various exemplary techniques for transferring convenience feature information between telephones within a home or small office, in accordance with the principles of the present invention.

In particular, as shown in FIG. 1A, information programmed into and stored in convenience feature memory 171a of a first telephone 171 is transmitted to one or more other telephones 172, 173, avoiding the need to reprogram the other telephones 172, 173 with such things as speed dial numbers, last dialed numbers, etc.

As shown in FIG. 1A, the data is transmitted over the telephone line 180, preferably while the telephone line is otherwise on-hook, and preferably at current levels safely below that which would otherwise cause the central office to detect an off-hook condition of the telephone line 180. The information may be transmitted using a proprietary communication protocol, using a standard digital transmission protocol but at low current levels (e.g., ISDN), or using audio tones (e.g., DTMF tones) mapped to correspond to particular ASCII characters.

While FIG. 1A depicts the transmission of convenience feature information between two corded telephones 171, 172 and a cordless telephone 173, the principles of the present invention relate equally to the transmission of convenience feature information between any type of customer premises equipment (e.g., between one or more telephone answering devices, between one or more facsimile machines, between only digital cordless devices, etc.)

FIG. 1B depicts information, originally stored in one telephone (e.g., corded telephone 271) is transmitted to another telephone (e.g., cordless telephone 273) via a suitable low range wireless transmission. A suitable wireless transmission front end and protocol is based on a Bluetooth standard, well known to those of ordinary skill in the art. Information regarding the Bluetooth protocol may be found, e.g., at www.bluetooth.com.

Accordingly, the telephones 271, 273 shown in FIG. 1B each include a suitable Bluetooth front end 271b, 273b, respectively. Under the direction of the user, a convenience feature data download may be requested from one of the telephones, e.g., from the cordless telephone 273, by establishing a wireless network link with a desired 'base' or 'master programmed' telephone, e.g., from the corded telephone 271.

In a third embodiment, shown in FIG. 1C, convenience feature data may be transmitted between two telephones using removable storage, e.g., using a floppy disk 279, memory stick (not shown), etc. Using this technique and apparatus, relevant convenience feature data may be stored on the floppy disk 279 under program direction at the direction of a convenience data transfer request from the user.

A convenience data transfer request may cause the download, upload, or synchronization of convenience data between the respective convenience memories of the two devices. Thus, convenience data need be programmed only once and spread among two or more telephones within a home. Moreover, telephones with corrupted memories or erased memories may be automatically updated or restored by another digital telephone in the same home or small office.

Figure 2:
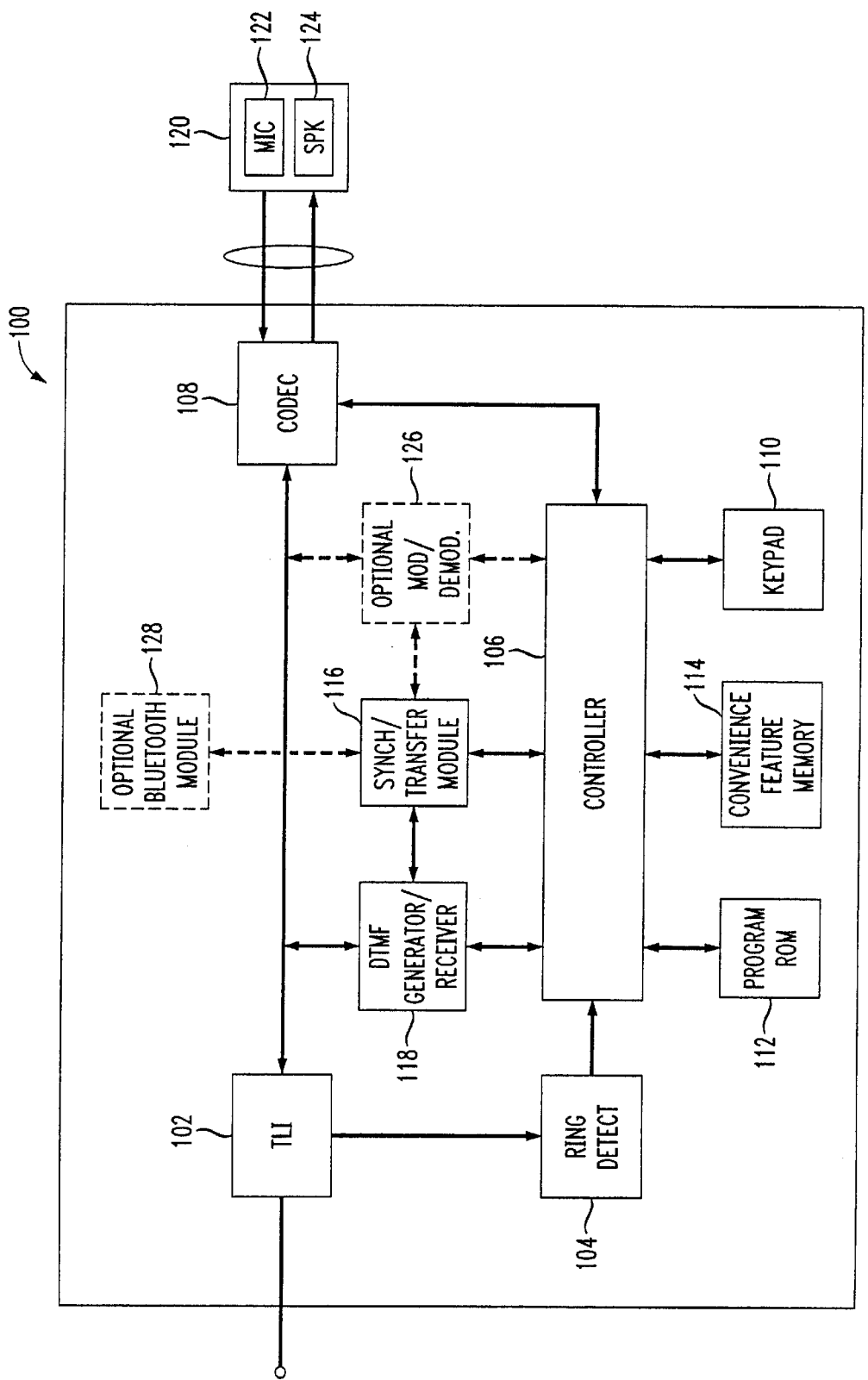
FIG. 2 illustrates a more detailed block diagram of an exemplary digital corded telephone capable of transferring convenience feature data, in accordance with an embodiment of the present invention.

FIG. 2 illustrates a more detailed block diagram of an exemplary digital corded telephone 100 capable of transferring convenience feature data, in accordance with an embodiment of the present invention.

In particular, FIG. 2 shows a corded telephone 100 with a telephone line interface (TLI) module 102, a ring detect circuit 104, a controller 106, a coder-decoder (CODEC) module 108, a keypad 110, a program Read Only Memory (ROM) 112, a memory 114, a synchronization/transfer module 116, a dual tone multiple frequency (DTMF) generator/receiver 118 and a handset 120. The handset 120 further includes a microphone 122 and a speaker 124.

The TLI module 102 is configured to provide an interface between the corded telephone 100 and a public switched telephone network.

The ring detect circuit 104 is configured to provide detection an incoming telephone call through the TLI module 102.

The controller 106 is configured to execute a software program or state machine that provides the functionality of the corded telephone 100. The controller 106 may be a digital signal processor (DSP), microprocessor, microcontroller, or combinational logic.

The CODEC 108 is configured to provide a conversion between voice signals and a telephone line.

The keypad 110 is configured to provide an interface for a user to operate the functions of the digital corded telephone 100.

Importantly, the synchronization/transfer module 116 is configured in the controller 106 to provide for the transfer of user-programmed convenience data between the memory 114 of an appropriate corded telephone 100 and convenience memory of another telephone. The synchronization/transfer module 116 may be activated in response to a keypress from the upload key 202 or the download key 204 or a synchronization key 206 (FIG. 3).

The synchronization/transfer module 116, as shown in FIG. 2, is illustrated as a separate module. However, the synchronization/transfer module 116 may also be incorporated as a software module of the software program or state machine implemented by the controller 106.

Figure 3:
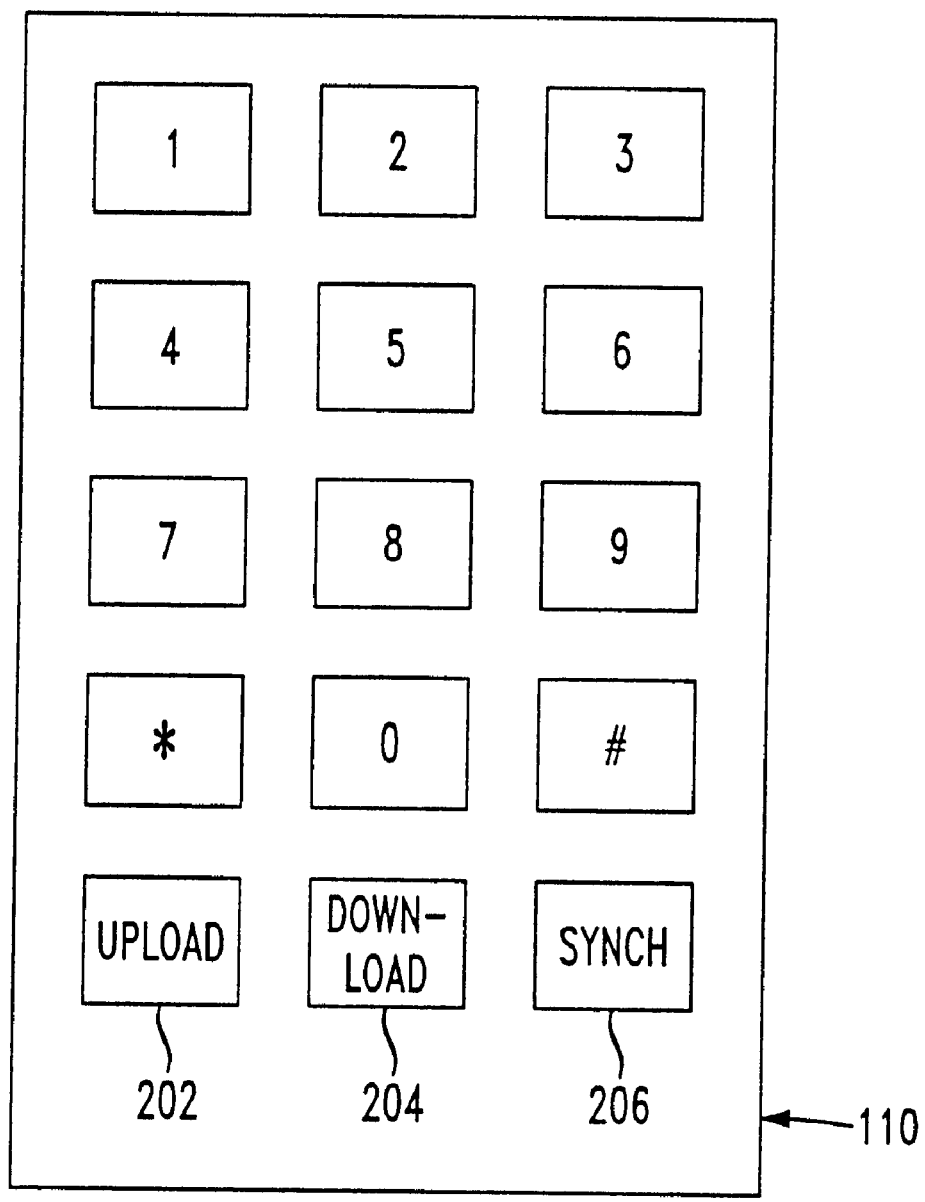
FIG. 3 illustrates a block diagram of keypad of the digital cordless telephone shown in FIG. 2.

As further illustrated in FIG. 3, the keypad 110 includes at least a standard 12-digit keypad, an upload key 202, a download key 204, and/or a synchronization key 206.

The upload key 202 may be configured to initiate a transfer of convenience data from the convenience memory 114 of one telephone to another.

The download key 204 may be configured to initiate a transfer of convenience data from the convenience memory 114 of one digital telephone to another.

The synchronization key 206 may be configured to initiate a transfer of convenience data between the convenience memories 114 of separate telephones.

Returning to FIG. 2, 110, the DTMF generator/receiver 118 may be configured to generate a composite audio signal over a telephone line through the TLI module 102 in response to keypresses of the keypad. The DTMF generator/receiver 118 may also be configured to receive DTMF signals and decode the received DTMF signals as binary commands or data for the controller 106.

The program ROM 112 may be configured to provide a storage medium to store software program forming a state machine that provides functionality of a telephone 100. The program ROM 112 may be implemented using a PROM, EPROM, EEPROM, a flash memory, or any other suitable non-volatile memory.

The convenience memory 114 is configured to provide for storage of user-programmed convenience data. The user programmed convenience data may be, e.g., frequently called numbers, caller ID tables, emergency numbers, speed dial numbers, etc.

The memory 114 may be removable from the telephone 100 such that it may be inserted into another telephone to provide convenience data to that other telephone. The memory 114 may be implemented using a random access memory, a flash memory, a removable storage, etc., but is probably non-volatile.

The handset 120 of the corded telephone 100 includes a microphone 122 and a speaker 124. The microphone 122 is configured to provide an interface a user to input voice signals into the corded telephone 100. The speaker 124 configured to provide an interface for a user to hear the output voice signals from the corded telephone 100.

Figure 4:
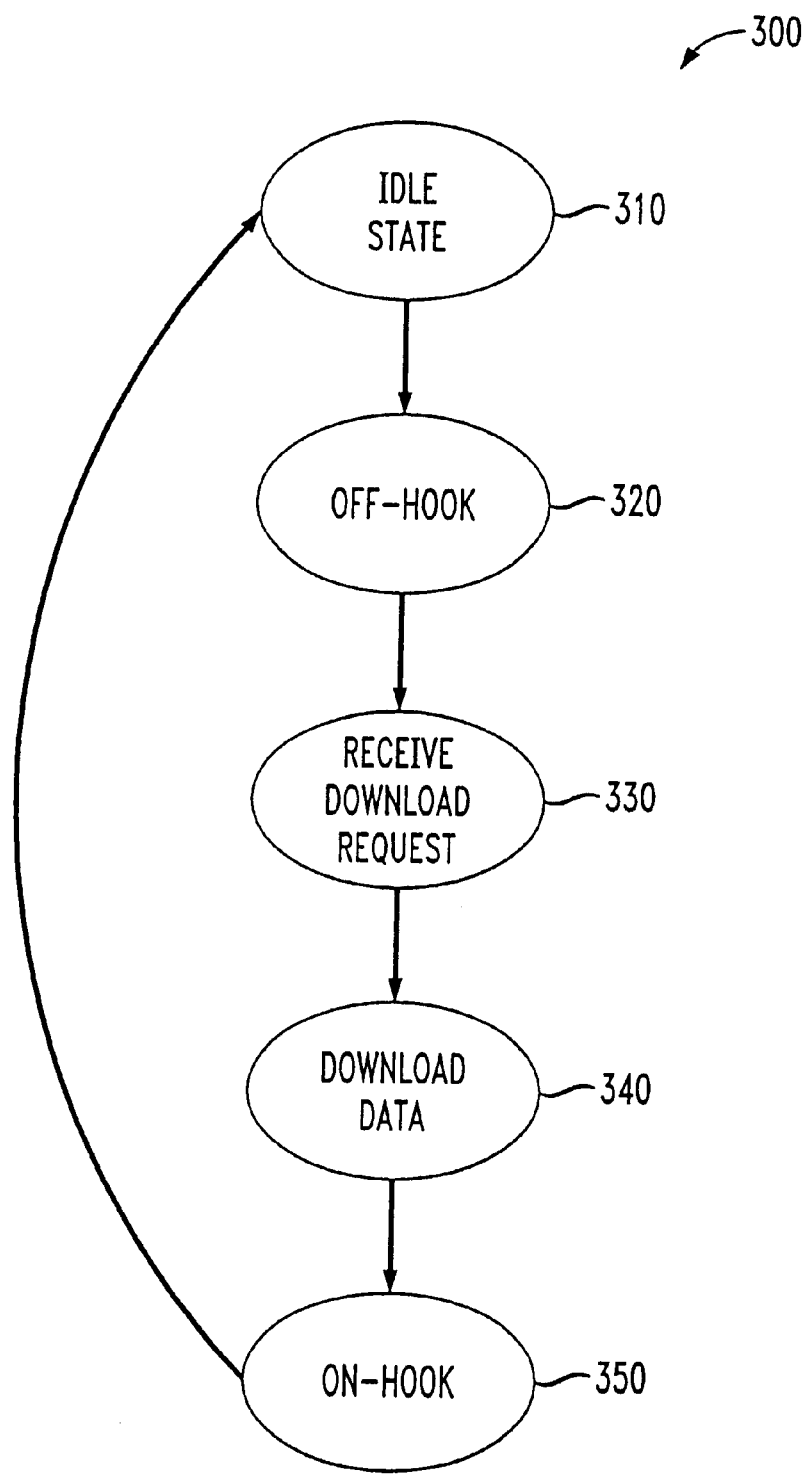
FIG. 4 illustrates a flow diagram of a download request for the digital corded telephone shown FIG. 2.

FIG. 4 illustrates an exemplary flow diagram of a request to download convenience data from another telephone to the requesting telephone.

In particular, the telephone 100 may be in an idle state. i.e., "on-hook" state, as shown in step 310.

In step 320, a user places the corded telephone 100 in an "off-hook" state by lifting the handset 118 from the cradle (not shown) of the corded telephone 100. In the event that the target device is another telephone, the user places the target telephone in an "off-hook" state, too.

The user initiates a download request by pressing the download key 204 on the keypad 110, in step 330. In response to the keypress, the controller 106 determines that the keypress is a download request and transfers controls to the synchronization/transfer module 116.

The synchronization/transfer module 116 initiates a negotiating protocol sequence to begin the transfer of data from a target device by generating a series of DTMF tones with the DTMF generator/receiver 118 over the telephone line to the target device. The negotiating protocol sequence is a predetermined sequence of tones that notifies the target device to establish a communication channel and to prepare to transmit data.

In response to the end of the negotiating protocol sequence, the target device converts the requested data or database to DTMF tones for transmission over the telephone line by a complementary DTMF generator/receiver (not shown). The corded telephone 100 receives the transmitted DTMF tones and decodes the DTMF tones at the DTMF generator/receiver 118. The recovered data or database is then transferred to the memory 114 for storage.

Alternatively, the transfer module 116 may initiate a transfer of data from the target device by using an optional modulation/demodulation module 126. In particular, once a download request is received, the negotiating protocol sequence is initiated by the modulation/demodulation module 126 over a telephone line through the TLI module 102. In response to the end of the negotiating protocol sequence, the target device modulates the data or database to be transferred by a complementary modulation/demodulation module (not shown) for transmission over the telephone line.

The corded telephone 100 received the modulated data over the telephone and demodulates the transmitted data with the modulation/demodulation module 126. The recovered data or database is then transferred to the memory 114 for storage.

The synchronization/transfer module 116 may also initiate a download request using an optional Bluetooth module 128. The Bluetooth module 128 is configured to provide a short range transmitter/receiver according to the published Bluetooth standard. The Bluetooth module 128 is also configured to provide a baseband protocol that is a combination of circuit and packet switching to support voice and data channels. The Bluetooth module 128 may also be configured to support up to seven other Bluetooth-enabled devices in a piconet.

Returning to FIG. 4, once a download request is received by the transfer module 116 in step 330, the negotiating protocol sequence is initiated by the Bluetooth module 128. In response, the target device prepares its data or database to be transferred by a complementary Bluetooth module (not shown) for transmission.

At the end of the end of the negotiating protocol sequence, the target device transmits the request data or database to the corded telephone 100 with the target device's complementary Bluetooth module.

The corded telephone 100 receives the data or database through the Bluetooth module 128. The data or database is then transferred to the memory 114.

Once the data or database has been transferred, the synchronization/transfer module 116 notifies the controller 106 to generate a pre-determined set of tones to inform the user of the end of the download process and to disable the communication channel between the corded telephone 100 and the target device. The user then replaces the handset 120 of the 100 which places the corded telephone 100 in an 'On-hook' state, in step 350. In response to the 'On-hook' state, the corded telephone 100 returns to the idle state of step 310.

Figure 5:
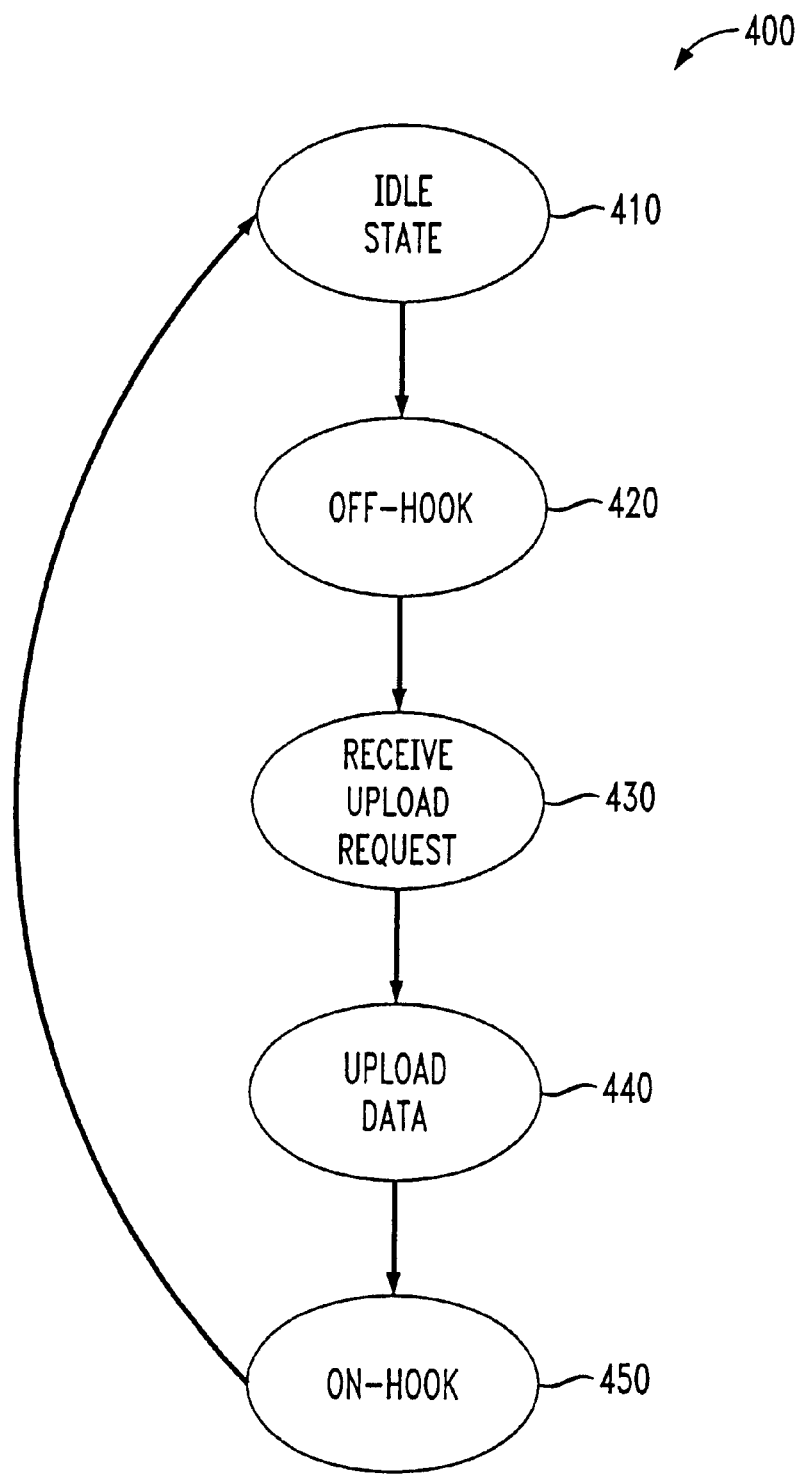
FIG. 5 illustrates a flow diagram of a upload request for the digital corded telephone shown in FIG. 2.

FIG. 5 illustrates a flow diagram 400 for an upload request for the corded telephone 100. In particular, the corded telephone 100 is shown to be in an idle state, 'on-hook' state, in step 410.

In step 410, the user places the corded telephone in an "off-hook" state by lifting the handset 120 from the cradle (not shown) of the corded telephone. In the event that the target device is another telephone, the user places the target telephone in an "off-hook" state, too.

A user initiates an upload request by pressing the upload key 202 on the keypad 110 of the corded telephone 100, in step 430. In response to the keypress, the controller 106 determines that the keypress is an upload request and transfers controls to the synchronization/transfer module 116.

The synchronization/transfer module 116 initiates a negotiating protocol sequence to begin the transfer of data from the corded telephone 100 by generating a series of DTMF tones with the DTMF generator/receiver 118 over the telephone line to the target device. The negotiating protocol sequence is a predetermined sequence of tones that notifies the target device to establish a communication channel and to prepare to receive data.

In response to the end of the negotiating protocol sequence, the corded telephone 100 converts the requested data or database to DTMF tones for transmission over the telephone line by the DTMF generator/receiver 118. The target device receives the transmitted DTMF tones and decodes the DTMF tones at a complementary DTMF generator/receiver (not shown). The recovered data or database is then transferred to the target device's memory for storage.

Alternatively, the transfer module 116 may initiate a transfer of data to the target device by using an optional modulation/demodulation module 126. In particular, once an upload request is received, the negotiating protocol sequence is initiated by the modulation/demodulation module 126 over a telephone line through the TLI module 102. In response to the end of the negotiating protocol sequence, the corded telephone 100 modulates the data or database to be transferred by the modulation/demodulation module 126 for transmission over the telephone line.

The target device receives the modulated data over the telephone line and demodulates the data with a complementary modulation/demodulation module (not shown). The recovered data or database is then transferred to the target device's memory for storage.

The synchronization/transfer module 116 may also initiate an upload request using an optional Bluetooth module 128. In particular, once an upload request is received, the negotiating protocol sequence is initiated by the Bluetooth module 128. In response, the target device prepares its data or database to be transferred by a complementary Bluetooth module (not shown) for transmission.

In response to the end of the negotiating protocol sequence, the corded telephone 100 transmits its data or database by the Bluetooth module 128.

The target device receives the data or database through a complementary Bluetooth module (not shown). The data or database is then transferred to the memory of the target device.

Once the data or database has been transferred, the synchronization/transfer module 116 notifies the controller 106 to generate a pre-determined set of tones to inform the user of the end of the upload request and to disable the communication channel between the corded telephone 100 and the target device. The user then replaces the handset 120 of the 100 which places the corded telephone 100 in an 'On-hook' state, in step 450. In response to the 'On-hook' state, the corded telephone 100 returns to the idle state of step 410.

Figure 6:
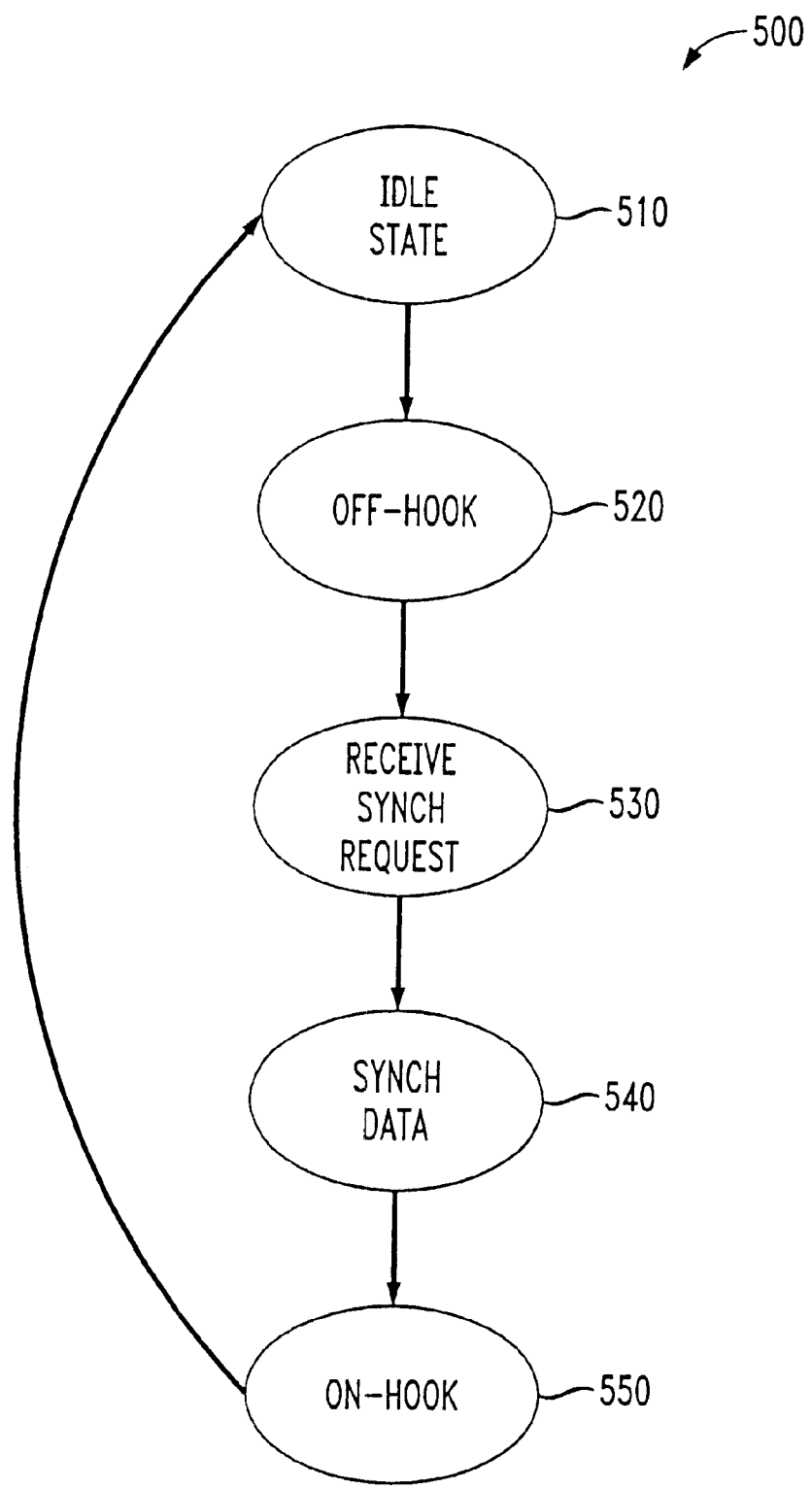
FIG. 6 illustrates a flow diagram of a synchronization request for the digital corded telephone shown in FIG. 2.

FIG. 6 illustrates a flow diagram 500 of a corded telephone implementing a synchronization request according to an embodiment of the present invention. In particular, the corded telephone 100 is shown to be in an idle state, "on-hook" state, in step 510.

In step 510, the user places the corded telephone in an "off-hook" state by lifting the handset from the cradle (not shown) of the corded telephone 100. In the event that the target device is another telephone, the user places the target telephone in an "off-hook" state, too.

A user initiates a synchronization request by pressing the synchronization key 206 on the keypad 110 of the corded telephone 100, in step 520. In response to the keypress of synchronization key, the synchronization/transfer module 116 initiates a negotiating protocol sequence to begin the transfer of synchronization data from the target device by generating a series of DTMF tones with the DTMF generator/receiver 118 over the telephone line to corded telephone 100. The negotiating protocol sequence is a pre-determined sequence of tones that notifies the target device to establish a communication channel and to prepare to transmit synchronization data.

In response to the end of the negotiating protocol sequence, the target device converts the requested synchronization data to DTMF tones for transmission over the telephone line by a complementary DTMF generator/receiver (not shown). The corded telephone 100 receives the transmitted DTMF tones and decodes the DTMF tones at the DTMF generator/receiver 118. The recovered synchronization data is then used to synchronize the data stored in the memory 114 by the synchronization/transfer module 116.

Alternatively, the transfer module 116 may initiate a transfer of synchronization data from the target device by using an optional modulation/demodulation module 126. In particular, once a synchronization request is received, the negotiating protocol sequence is initiated by the modulation/demodulation module 126 over a telephone line through the TLI module 102. In response, the target device modulates the synchronization data to be transferred by a complementary modulation/demodulation module (not shown) for transmission over the telephone line.

The corded telephone 100 received the modulated data over the telephone and demodulates the transmitted synchronization data with the modulation/demodulation module 126. The recovered synchronization data is then utilized to synchronize the data stored in the memory 114 by the synchronization/transfer module 116.

The synchronization/transfer module 116 may also initiate a synchronization request using an optional Bluetooth module 128. In response to the synchronization request, the negotiating protocol sequence is initiated by the Bluetooth module 128. In response, the target device prepares its synchronization data to be transferred by a complementary Bluetooth module (not shown) for transmission.

The corded telephone 100 receives the synchronization data through the Bluetooth module 128. The recovered synchronization data is then utilized to synchronize the data stored in the memory 114 by the synchronization/transfer module 116.

Once all the synchronization data has been transferred, the synchronization/transfer module 116 notifies the controller 106 to generate a pre-determined set of tones to inform the user of the end of the synchronization request and to disable the communication channel between the corded telephone 100 and the target device. The user then replaces the handset 120 of the 100 which places the corded telephone 100 in an 'On-hook' state, in step 550. In response to the 'On-hook' state, the corded telephone 100 returns to the idle state of step 510.

According to the disclosed embodiment, a corded telephone includes a memory located within the corded telephone configured for storing data, and a transfer module configured to transfer requested data between the memory and a target device in response to a transfer request. A corded telephone may use a DTMF generator/receiver, optional demodulator/modulator module, or a Bluetooth module to establish a communication path between the corded telephone and a target device to perform a database upload, download, or a synchronization request. Thus, by providing means to transfer data between corded and a target device, information may be automatically shared locally or remotely between devices. Moreover, corded telephones with corrupted memories or erased memories may be automatically updated or restored.

Figure 7:
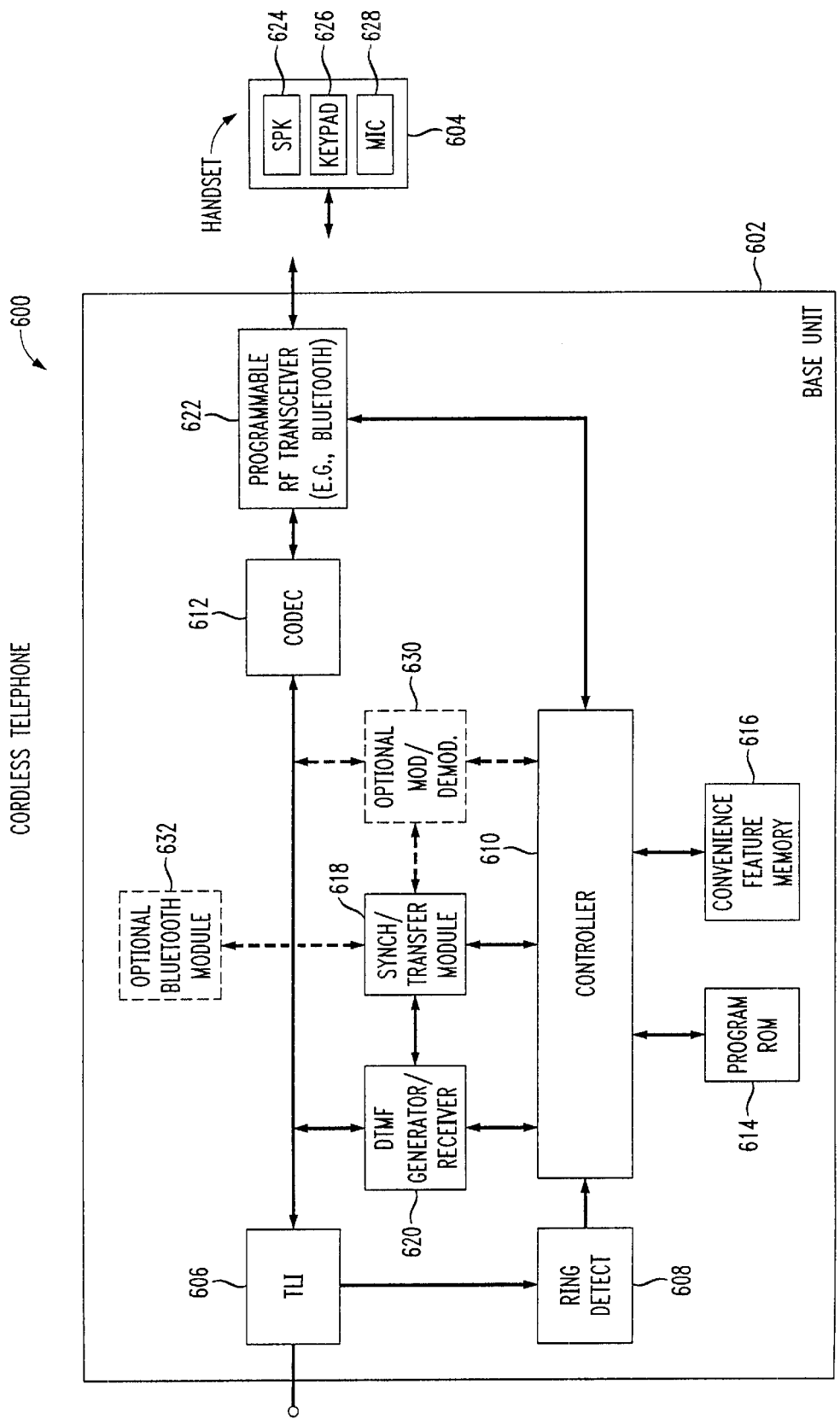
FIG. 7 shows a block diagram of a digital cordless telephone for transferring data according to another embodiment of the present invention.
Figure 8:
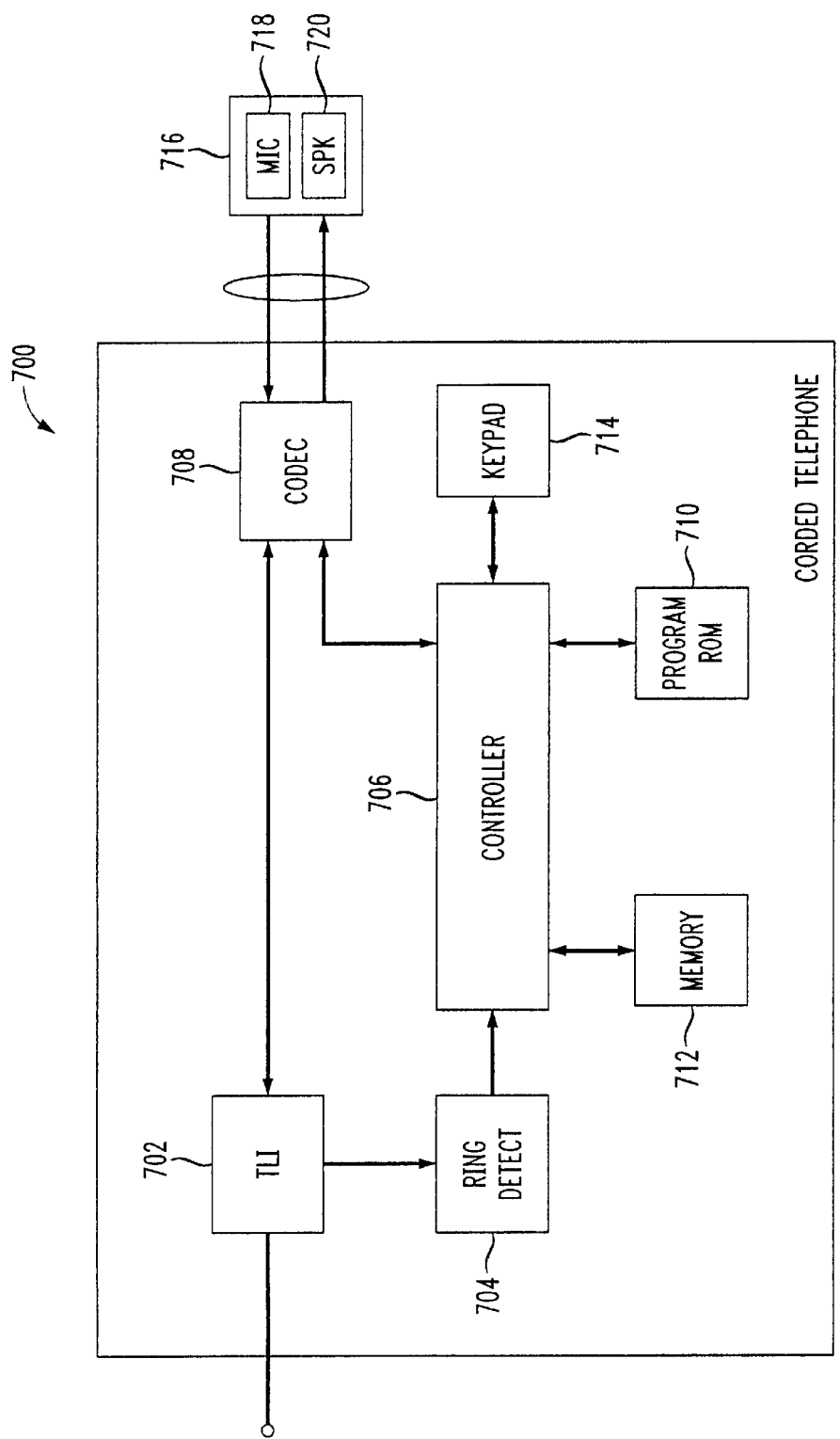
FIG. 8 shows a block diagram of a conventional digital corded telephone.
Figure 9A:
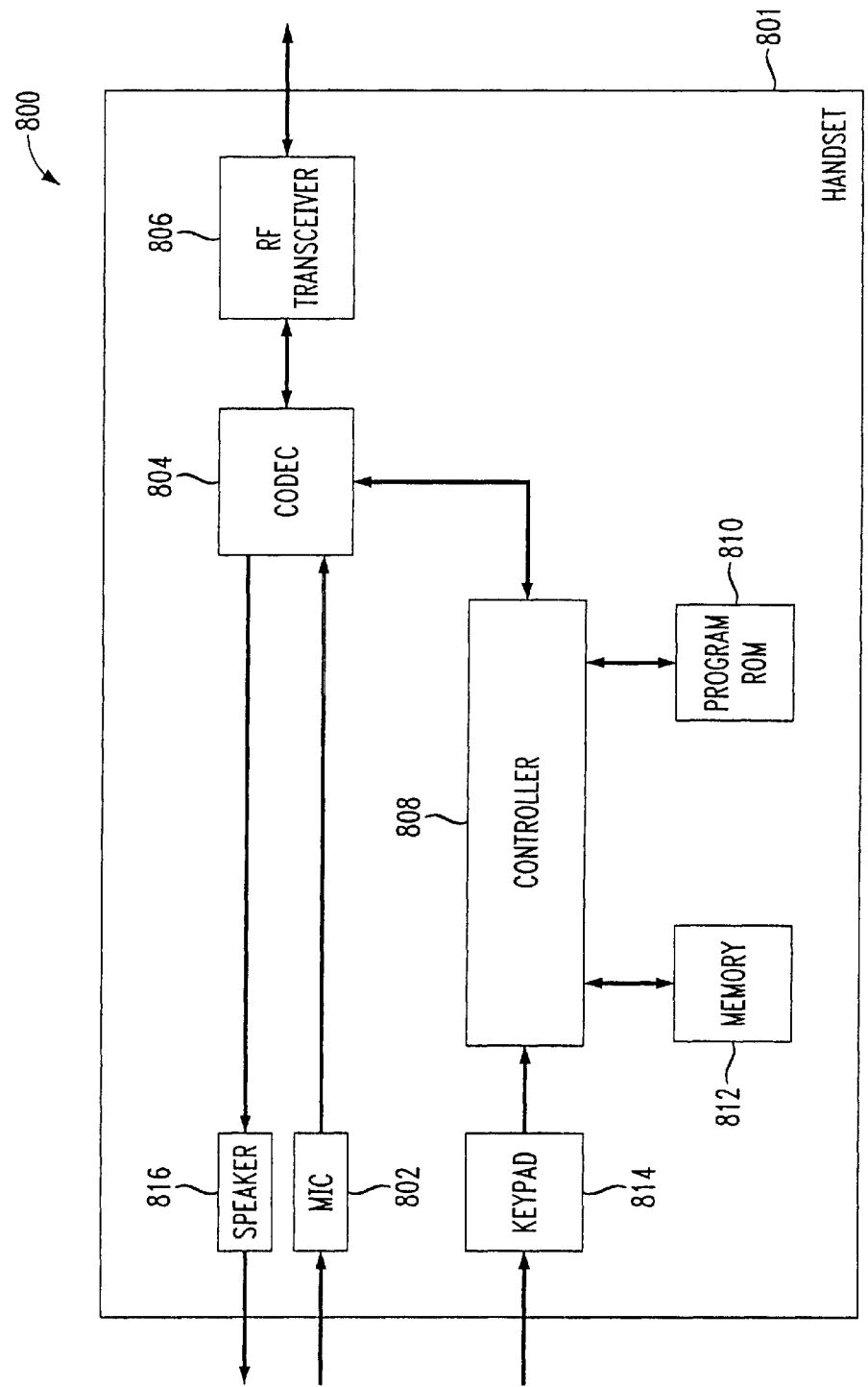
FIGS. 9A and 9B show block diagrams of a conventional digital cordless telephone.
Figure 9B:
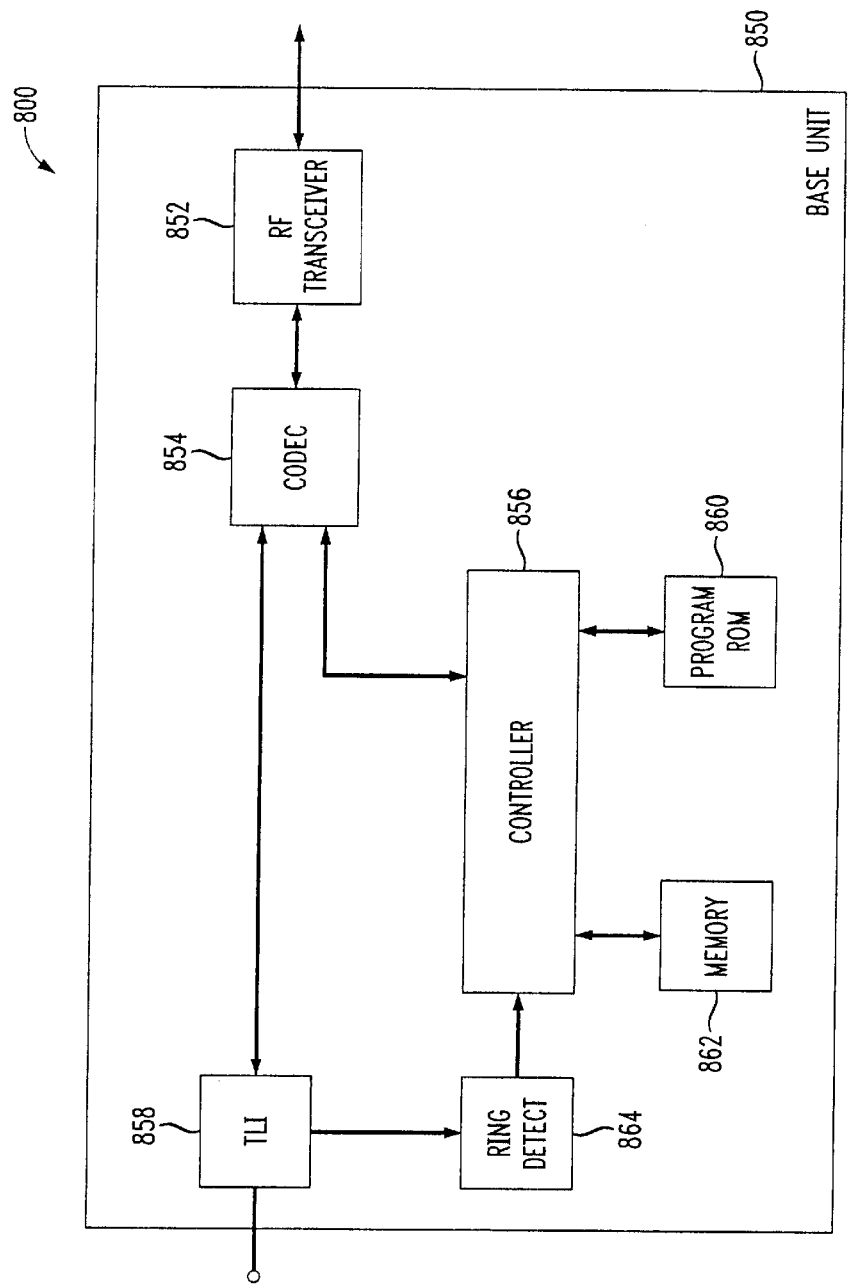

FIG. 7 illustrates a block diagram of a cordless telephone 600 for transferring data or information according to another embodiment of the present invention. In particular, the cordless telephone 600 includes a base unit 602 and a cordless handset 604. Similar to the corded telephone 100 of FIG. 2, the base unit 602 of the cordless telephone 600 includes a TLI module 606, a ring detect circuit 608, a controller 610, a coder-decoder (CODEC) module 612, a program Read Only Memory (ROM) 614, a memory 616, a transfer module 618, and a DTMF generator/receiver 620. The base unit 602 of the cordless telephone 600 also includes a programmable radio frequency (RF) transceiver 622.

The cordless handset 604 includes complementary circuitry to the base unit 602. The cordless handset also includes a speaker 624, a microphone 626, and a keypad 628.

The controller 610 may be a digital signal processor (DSP), microprocessor, microcontroller, or combinational logic. The controller 610 provides an execution platform to execute a suitable software program to operate the cordless telephone 600.

The CODEC 612 provides a way to convert between analog voice signals and digital voice signals. The CODEC 612 is an electronic device that converts analog voice signals to digital voice signals via an analog-to-digital converter. Also, the CODEC 612 converts received digital voice signals to analog voice signals via a digital-to-analog converter.

The programmable RF transceiver 622 is configured to provide an RF interface between the base unit 602 and cordless handset 604. The programmable RF transceiver 622 provides a conversion between RF signals and the digitized voice signals.

The program ROM 614 provides a storage medium to store software that operates the cordless telephone 600.

The microphone 626 is configured to provide an interface for the user to input voice signals into the cordless telephone 600.

The speaker 624 is configured to provide an interface to output voice signals from the cordless telephone 600.

The keypad 628 is configured to provide an interface for the user to operate the cordless telephone 600. The keypad 628 is similar to the keypad 110 of the corded telephone 100.

The cordless telephone 600 implements a download request, an upload request, and a synchronization request of FIGS. 3, 4, and 5, respectively, similar to that of the corded telephone 100. In addition of transferring data using the DTMF generator/receiver 620, an optional demodulator/modulator module 630, or an optional Bluetooth module 632, the cordless telephone 600 may also implement a data transfer using the programmable RF transceiver 622.

In particular, the synchronization/transfer module 618 initiates a negotiating protocol sequence with the programmable RF transceiver 622 in response to a download request, upload request, or a synchronization request. The synchronization/transfer module 618 is further configured to utilize the programmable RF transceiver 622 to initiate the negotiating protocol sequence and to transfer data or synchronization data on a predetermined frequency through the programmable RF transceiver 622. In response, a target device initiates a sequence of events to receive or transmit data according to the requested action, i.e., download, upload, or synchronization request, through a complementary programmable RF transceiver.

According to the disclosed embodiment, a cordless telephone includes a memory located within the cordless telephone configured for storing data, and a transfer module configured to transfer requested data between the memory and a target device in response to a transfer request. A cordless telephone may use a DTMF generator/receiver, optional demodulator/modulator module, a programmable RF transceiver, or a Bluetooth module to establish a communication path between the cordless telephone and a target device to perform a database upload, download, or a synchronization request. Thus, by providing means to transfer data between cordless telephone and a target device, information may be automatically shared locally or remotely between devices. Moreover, cordless telephones with corrupted memories or erased memories may be automatically updated or restored.

While the invention has been described with reference to the exemplary embodiments thereof, those skilled in the art will be able to make various modifications to the described embodiments of the invention without departing from the true spirit and scope of the invention.

What is claimed is:

1. A telephone module capable of transferring convenience feature data between separate telephones, comprising:

a convenience feature data memory located within a first telephone configured to store convenience feature data relevant to said first telephone; and a data transfer module, in communication with said convenience feature data memory, configured to transfer said convenience feature data to another telephone utilizing at least one of a Bluetooth front end, an on-hook telephone line and an off-hook telephone line.

2. The telephone module capable of transferring convenience feature data between separate telephones according to claim 1, further comprising:

a download key, activatable by a user of said another telephone, and configured to cause said data transfer module to transfer said convenience feature data from said convenience feature data memory of said first telephone to convenience feature data memory of said another telephone.

3. The telephone module capable of transferring convenience feature data between separate telephones according to claim 1, wherein:

said data transfer module is adapted to synchronize said convenience feature data between said first telephone and said another telephone.

4. The telephone module capable of transferring convenience feature data between separate telephones according to claim 1, further comprising:

an upload key, activatable by a user of said another telephone, and configured to request a transfer of said convenience feature data from said another telephone to said convenience feature data memory of said first telephone.

5. The telephone module capable of transferring convenience feature data between separate telephones according to claim 1, further comprising:

a synchronization module configured to synchronize data in said convenience feature data memory of said first telephone with a convenience data memory in said another telephone.

6. Apparatus for transferring convenience feature data to a user's telephone from another telephone, comprising:

means for initiating a request to transfer said convenience data from said another telephone; and means for transferring said convenience feature data from said another telephone to said user's telephone in response to said transfer request utilizing at least one of a Bluetooth front end, an on-hook telephone line and an off-hook telephone line.

7. The apparatus for transferring convenience feature data to a user's telephone from another telephone according to claim 6, wherein:

said means for initiating said request is located in said user's telephone.

8. The apparatus for transferring convenience feature data to a user's telephone from another telephone according to claim 6, wherein:

said means for initiating said request is located in said another telephone.

9. The apparatus for transferring convenience feature data to a user's telephone from another telephone according to claim 6, wherein said convenience feature data includes at least one of:

speed dial telephone numbers; and caller ID telephone numbers.

10. A method of transferring convenience feature data to a user's telephone from another telephone, comprising:

initiating a request to transfer said convenience data from said another telephone; and transferring said convenience feature data from said another telephone to said user's telephone in response to said transfer request utilizing at least one of a Bluetooth front end, an on-hook telephone line and an off-hook telephone line.

11. The method of transferring convenience feature data to a user's telephone from another telephone according to claim 10, wherein said convenience feature data includes at least one of:

speed dial telephone numbers; and caller ID telephone numbers.

12. The method of transferring convenience feature data to a user's telephone from another telephone according to claim 10, wherein:

said request is initiated from said user's telephone.

13. The method of transferring convenience feature data to a user's telephone from another telephone according to claim 10, wherein:

said request is initiated from said another telephone.

* * * * *